US012361810B2

(12) United States Patent
Venkateswaran et al.

(10) Patent No.: US 12,361,810 B2
(45) Date of Patent: Jul. 15, 2025

(54) CONTEXT AWARE FALL DETECTION USING A MOBILE DEVICE

(71) Applicant: Apple Inc., Cupertino, CA (US)

(72) Inventors: Sriram Venkateswaran, Sunnyvale, CA (US); Parisa Dehleh Hossein Zadeh, San Jose, CA (US); Vinay R. Majjigi, Mountain View, CA (US); Yann Jerome Julien Renard, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/617,381

(22) Filed: Mar. 26, 2024

(65) Prior Publication Data

US 2024/0233507 A1 Jul. 11, 2024

Related U.S. Application Data

(63) Continuation of application No. 17/942,018, filed on Sep. 9, 2022, now abandoned.

(60) Provisional application No. 63/242,998, filed on Sep. 10, 2021.

(51) Int. Cl.
*G08B 21/04* (2006.01)

(52) U.S. Cl.
CPC .................................. *G08B 21/043* (2013.01)

(58) Field of Classification Search
CPC .................................................... G08B 21/043
USPC .......................................................... 340/432
See application file for complete search history.

(56) References Cited

U.S. PATENT DOCUMENTS

| | | | | |
|---|---|---|---|---|
| 8,573,982 | B1 | 11/2013 | Chuang | |
| 9,974,478 | B1 | 5/2018 | Brokaw et al. | |
| 10,147,296 | B2 * | 12/2018 | Gregg | G08B 25/001 |
| 10,446,017 | B1 * | 10/2019 | Gershoni | G08B 21/043 |
| 10,978,195 | B2 * | 4/2021 | Blahnik | A61B 5/1116 |
| 11,016,111 | B1 | 5/2021 | Chuang | |
| 11,020,064 | B2 * | 6/2021 | Fountaine | G10L 25/66 |
| 11,170,295 | B1 * | 11/2021 | Carmichael | G06N 3/084 |
| 2008/0045804 | A1 | 2/2008 | Williams | |
| 2009/0040052 | A1 * | 2/2009 | Cameron | G08B 25/016 340/573.1 |
| 2011/0288811 | A1 | 11/2011 | Greene | |
| 2011/0313705 | A1 | 12/2011 | Esser et al. | |

(Continued)

FOREIGN PATENT DOCUMENTS

| | | | |
|---|---|---|---|
| CN | 106530611 | A | 3/2017 |
| CN | 106875630 | A | 6/2017 |

(Continued)

*Primary Examiner* — Zhen Y Wu
(74) *Attorney, Agent, or Firm* — Fish & Richardson P.C.

(57) ABSTRACT

In an example method, a mobile device receives sensor data obtained by one or more sensor over a time period. The one or more sensors are worn by a user. Further, the mobile device determines a context of the user based on the sensor data, and obtains a set of rules for processing the sensor data based on the context, where the set of rules is specific to the context. The mobile device determines at least one of a likelihood that the user has fallen or a likelihood that the user requires assistance based on the sensor data and the set of rules, and generates one or more notifications based on at least one of the likelihood that the user has fallen or the likelihood that the user requires assistance.

20 Claims, 13 Drawing Sheets

(56) References Cited

U.S. PATENT DOCUMENTS

| | | | | |
|---|---|---|---|---|
| 2012/0223833 | A1* | 9/2012 | Thomas | G16H 50/30 |
| | | | | 702/19 |
| 2013/0023798 | A1 | 1/2013 | Greene et al. | |
| 2013/0090083 | A1* | 4/2013 | DeMont | A61B 5/746 |
| | | | | 340/539.13 |
| 2013/0110475 | A1 | 5/2013 | Greene et al. | |
| 2013/0190658 | A1 | 7/2013 | Flaction et al. | |
| 2013/0218053 | A1 | 8/2013 | Kaiser et al. | |
| 2014/0156215 | A1 | 6/2014 | Eastman et al. | |
| 2014/0343460 | A1 | 11/2014 | Evans et al. | |
| 2014/0378786 | A1* | 12/2014 | Hong | A61B 5/7235 |
| | | | | 600/301 |
| 2015/0061863 | A1* | 3/2015 | Barfield, Jr. | G08B 21/0446 |
| | | | | 340/539.11 |
| 2015/0145662 | A1* | 5/2015 | Barfield, Jr. | G08B 21/0492 |
| | | | | 340/436 |
| 2015/0199895 | A1* | 7/2015 | Hilliges | G08B 25/10 |
| | | | | 340/425.5 |
| 2015/0213702 | A1* | 7/2015 | Kimmel | G06V 20/52 |
| | | | | 382/103 |
| 2015/0221202 | A1* | 8/2015 | Russell | A61B 5/1117 |
| | | | | 340/573.7 |
| 2015/0230734 | A1 | 8/2015 | Cheung | |
| 2015/0269824 | A1* | 9/2015 | Zhang | A61B 5/746 |
| | | | | 340/539.12 |
| 2015/0362330 | A1 | 12/2015 | Omr et al. | |
| 2016/0095539 | A1 | 4/2016 | Kim et al. | |
| 2016/0101319 | A1 | 4/2016 | Tanabe et al. | |
| 2016/0210838 | A1* | 7/2016 | Yan | G08B 25/001 |
| 2016/0249833 | A1 | 9/2016 | Ronchi et al. | |
| 2018/0000385 | A1* | 1/2018 | Heaton | G08B 25/016 |
| 2018/0020950 | A1 | 1/2018 | Finch et al. | |
| 2018/0235516 | A1 | 8/2018 | Morris Bamberg | |
| 2018/0279915 | A1* | 10/2018 | Huang | A61B 5/6807 |
| 2019/0103007 | A1* | 4/2019 | Tan | A61B 5/681 |
| 2019/0150793 | A1 | 5/2019 | Barth et al. | |
| 2020/0147451 | A1 | 5/2020 | Frank et al. | |
| 2020/0330001 | A1 | 10/2020 | Romrell et al. | |
| 2020/0342735 | A1* | 10/2020 | Tan | G01C 5/06 |
| 2020/0409467 | A1* | 12/2020 | Rispens | G06F 17/18 |
| 2021/0005071 | A1 | 1/2021 | Sharma et al. | |
| 2021/0052198 | A1* | 2/2021 | Parvaneh | A61B 5/1117 |
| 2021/0056828 | A1* | 2/2021 | Ten Kate | G08B 21/0446 |
| 2021/0166545 | A1* | 6/2021 | Saporito | G08B 31/00 |
| 2021/0369141 | A1 | 12/2021 | Wu | |
| 2021/0393166 | A1 | 12/2021 | DeMers et al. | |
| 2022/0198902 | A1* | 6/2022 | Yao | G08B 21/043 |
| 2022/0287590 | A1 | 9/2022 | Gailey et al. | |
| 2022/0330854 | A1 | 10/2022 | Jagannathan et al. | |
| 2023/0084356 | A1 | 3/2023 | Venkateswaran et al. | |
| 2024/0315601 | A1 | 9/2024 | DeMers et al. | |

FOREIGN PATENT DOCUMENTS

| | | | |
|---|---|---|---|
| CN | 111887859 | A | 11/2020 |
| DE | 102016210505 | A1 | 3/2017 |
| EP | 3796282 | A2 | 3/2021 |
| KR | 1020170108072 | A | 9/2017 |
| KR | 1020200102805 | A | 9/2020 |
| WO | WO2016037089 | A1 | 3/2016 |
| WO | WO2019067424 | A1 | 4/2019 |

* cited by examiner

400

600

620

CONTEXT AWARE FALL DETECTION USING A MOBILE DEVICE

CROSS-REFERENCE TO RELATED APPLICATIONS

This application is a continuation of, and claims priority to, U.S. patent application Ser. No. 17/942,018, filed Sep. 9, 2022, which claims priority to U.S. Provisional Patent Application No. 63/242,998, filed Sep. 10, 2021, the entire contents of each of which are incorporated herein by reference.

TECHNICAL FIELD

The disclosure relates to systems and methods for determining whether a user has fallen using a mobile device.

BACKGROUND

A motion sensor is a device that measures the motion experienced by an object (e.g., the velocity or acceleration of the object with respect to time, the orientation or change in orientation of the object with respect to time, etc.). In some cases, a mobile device (e.g., a cellular phone, a smart phone, a tablet computer, a wearable electronic device such as a smart watch, etc.) can include one or more motion sensors that determine the motion experienced by the mobile device over a period of time. If the mobile device is worn by a user, the measurements obtained by the motion sensor can be used to determine the motion experienced by the user over the period of time.

SUMMARY

Systems, methods, devices and non-transitory, computer-readable media are disclosed for electronically determining whether a user has fallen using a mobile device.

In an aspect, a method includes: receiving, by a mobile device, sensor data obtained by one or more sensor over a time period, where the one or more sensors are worn by a user; determining, by the mobile device, a context of the user based on the sensor data; obtaining, by the mobile device based on the context, a set of rules for processing the sensor data, where the set of rules is specific to the context; determining, by the mobile device, at least one of a likelihood that the user has fallen or a likelihood that the user requires assistance based on the sensor data and the set of rules; and generating, by the mobile device, one or more notifications based on at least one of the likelihood that the user has fallen or the likelihood that the user requires assistance.

Implementations of this aspect can include one or more of the following features.

In some implementations, the sensor data can include location data obtained by one or more location sensors of the mobile device.

In some implementations, the sensor data can include acceleration data obtained by one or more acceleration sensors of the mobile device.

In some implementations, the sensor data can include orientation data obtained by one or more orientation sensors of the mobile device.

In some implementations, the context can correspond to the user bicycling during the time period.

In some implementations, determining the likelihood that the user has fallen and/or the likelihood that the user requires assistance can include: determining, based on the sensor data, that a distance traveled by the user prior over the period of time is greater than a first threshold value; determining, based on the sensor data, that a variation in a direction of impacts experienced by the user over the period of time is less than a second threshold value; determining, based on the sensor data, that a rotation of the user's wrist over the period of time is less than a third threshold value; and determining that the user has fallen and/or requires assistance based on the determination that the distance traveled by the user prior over the period of time is greater than the first threshold value, the determination that the variation in a direction of impacts experienced by the user over the period of time is less than the second threshold value, and the determination that the rotation of the user's wrist over the period of time is less than the third threshold value.

In some implementations, determining the likelihood that the user has fallen and/or the likelihood that the user requires assistance can include: determining, based on the sensor data, that a magnitude of an impact experienced by the user over the period of time in a first direction is greater than a first threshold value; and determining that the user has fallen and/or requires assistance based on the determination that the magnitude of the impact experienced by the user over the period of time in the first direction is greater than the first threshold value.

In some implementations, determining the likelihood that the user has fallen and/or the likelihood that the user requires assistance can include: determining, based on the sensor data, that a change in an orientation of the user's hand over the period of time is greater than a first threshold value; determining, based on the sensor data, that a magnitude of an impact experienced by the user over the period of time in a first direction is greater than a second threshold value, where the first direction is orthogonal to the second threshold value; determining, based on the sensor data, that a magnitude of an impact experienced by the user over the period of time in a second direction is greater than a third threshold value; and determining that the user has fallen and/or requires assistance based on the determination that the change in an orientation of the user's hand over the period of time is greater than the first threshold value, the determination that the magnitude of the impact experienced by the user over the period of time in the first direction is greater than the second threshold value, and the determination that the magnitude of an impact experienced by the user over the period of time in the second direction is greater than the third threshold value.

In some implementations, the method can further include: receiving, by the mobile device, second sensor data obtained by the one or more sensor over a second time period; determining, by the mobile device, a second context of the user based on the second sensor data; obtaining, by the mobile device based on the second context, a second set of rules for processing the sensor data, where the second set of rules is specific to the second context; determining, by the mobile device, at least one of a likelihood that the user has fallen and/or a likelihood that the user requires assistance based on the sensor data and the second set of rules; and generating, by the mobile device, one or more second notifications based on at least one of the likelihood that the user has fallen or the likelihood that the user requires assistance.

In some implementations, the second context can correspond to the user walking during the second time period.

In some implementations, the second context can correspond to the user playing at least one of basketball or volleyball during the second time period.

In some implementations, generating the one or more notifications can include: transmitting a first notification to a communications device remote from the mobile device, the first notification including an indication that the user has fallen.

In some implementations, the communications device can be an emergency response system.

In some implementations, the mobile device can be a wearable mobile device.

In some implementations, at least some of the one or more sensors can be disposed on or in the mobile device.

In some implementations, at least some of the one or more sensors can be remote from the mobile device.

Other implementations are directed to systems, devices and non-transitory, computer-readable mediums including computer-executable instructions for performing the techniques described herein.

The details of one or more embodiments are set forth in the accompanying drawings and the description below. Other features and advantages will be apparent from the description and drawings, and from the claims.

DETAILED DESCRIPTION

Overview

Figure 1:
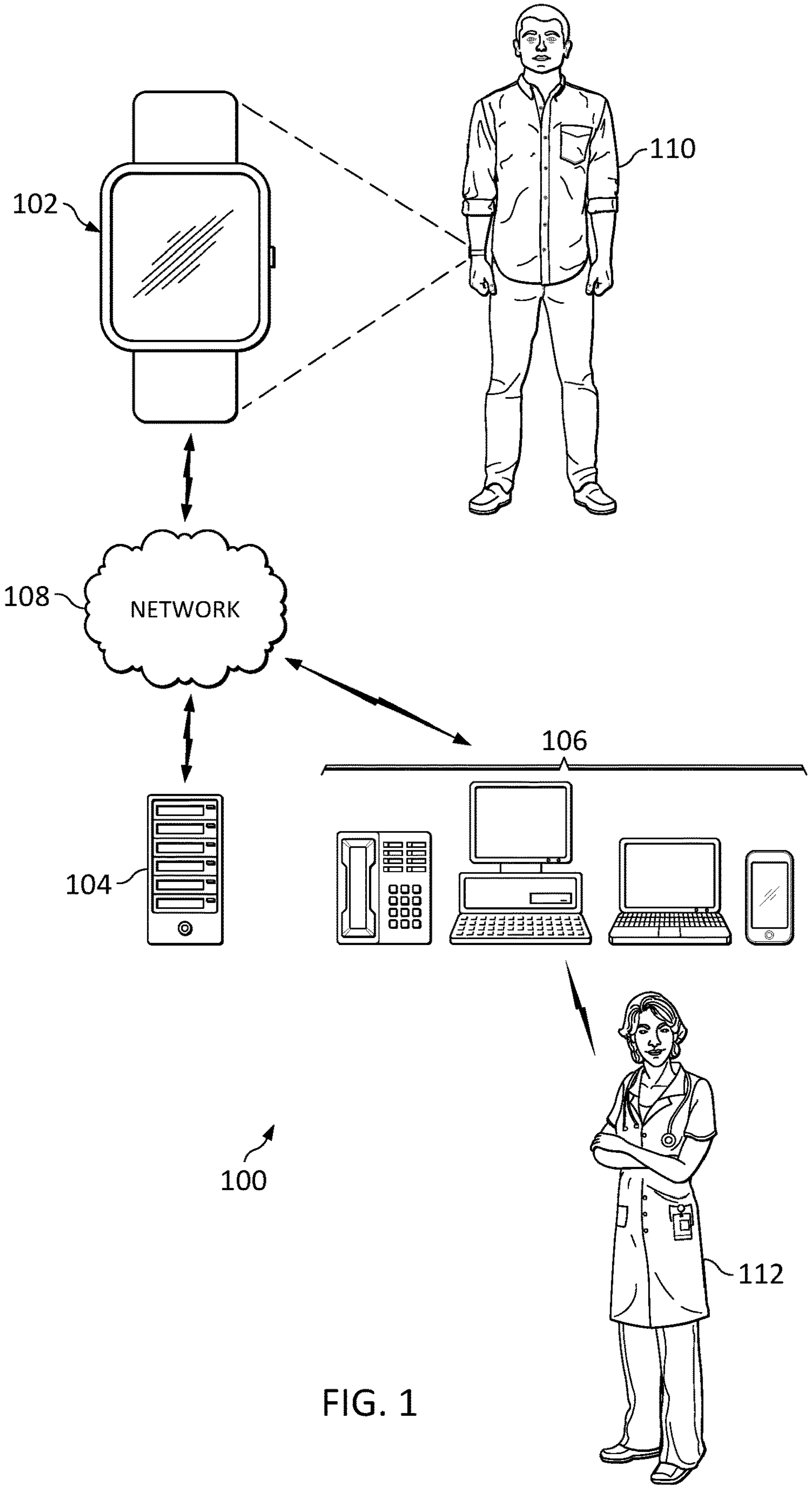
FIG. 1 is a diagram of an example system for determining whether a user has fallen and/or may be in need of assistance.

FIG. 1 shows an example system 100 for determining whether a user has fallen and/or may be in need of assistance. The system 100 includes a mobile device 102, a server computer system 104, communications devices 106, and a network 108.

The implementations described herein enable the system 100 to determine whether a user has fallen and/or whether the user may be in need of assistance more accurately, such that resources can be more effectively used. For instance, the system 100 can determine whether the user has fallen and/or whether the user may be in need of assistance with fewer false positives. Thus, the system 100 is less likely to consume computational and/or network resources to generate and transmit notifications to others when the user does not need assistance. Further, medical and logistical resources can be deployed to assist a user with a greater degree of confidence that they are needed, thereby reducing the likelihood of waste. Accordingly, resources can be consumed more efficiently, and in a manner that increases the effective response capacity of one or more systems (e.g., a computer system, a communications system, and/or an emergency response system).

The mobile device 102 can be any portable electronic device for receiving, processing, and/or transmitting data, including but not limited to cellular phones, smart phones, tablet computers, wearable computers (e.g., smart watches), and the like. The mobile device 102 is communicatively connected to server computer system 104 and/or the communications devices 106 using the network 108.

The server computer system 104 is communicatively connected to mobile device 102 and/or the communications devices 106 using the network 108. The server computer system 104 is illustrated as a respective single component. However, in practice, it can be implemented on one or more computing devices (e.g., each computing device including at least one processor such as a microprocessor or microcontroller). A server computer system 104 can be, for instance, a single computing device that is connected to the network 108. In some implementations, the server computer system 104 can include multiple computing devices that are connected to the network 108. In some implementations, the server computer system 104 need not be located locally to the rest of the system 100, and portions of a server computer system 104 can be located in one or more remote physical locations.

A communications device 106 can be any device that is used to transmit and/or receive information transmitted across the network 108. Examples of the communications devices 106 include computers (such as desktop computers, notebook computers, server systems, etc.), mobile devices (such as cellular phones, smartphones, tablets, personal data assistants, notebook computers with networking capability), telephones, faxes, and other devices capable of transmitting and receiving data from the network 108. The communications devices 106 can include devices that operate using one or more operating system (e.g., Apple iOS, Apple watchOS, Apple macOS, Microsoft Windows, Linux, Unix, Android, etc.) and/or architectures (e.g., x86, PowerPC, ARM, etc.) In some implementations, one or more of the communications devices 106 need not be located locally with respect to the rest of the system 100, and one or more of the communications devices 106 can be located in one or more remote physical locations.

The network 108 can be any communications network through which data can be transferred and shared. For example, the network 108 can be a local area network (LAN) or a wide-area network (WAN), such as the Internet. As another example, the network 108 can be a telephone or cellular communications network. The network 108 can be implemented using various networking interfaces, for instance wireless networking interfaces (such as Wi-Fi, Bluetooth, or infrared) or wired networking interfaces (such as Ethernet or serial connection). The network 108 also can include combinations of more than one network, and can be implemented using one or more networking interfaces.

Figure 2A:
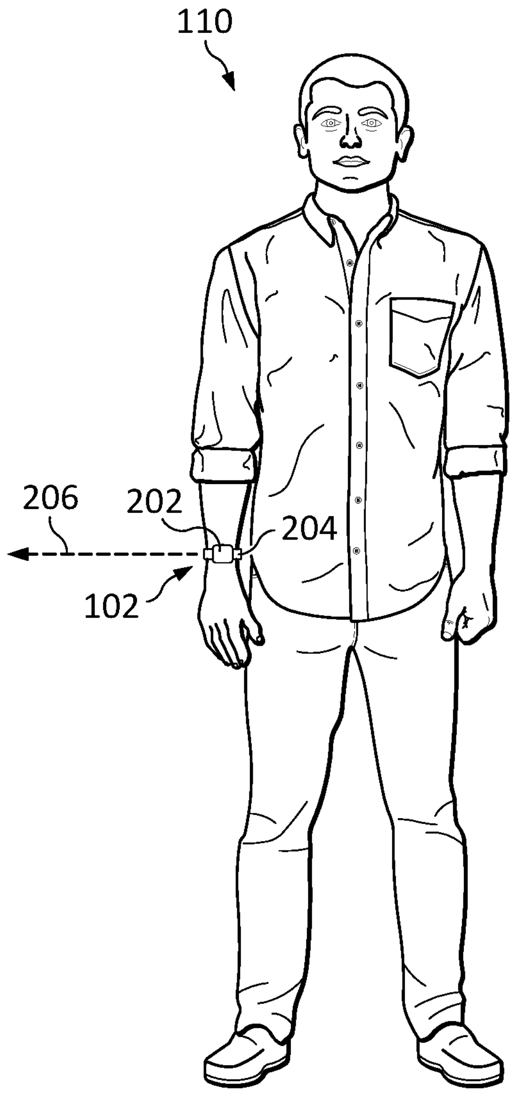
FIG. 2A is a diagram showing an example position of a mobile device on a user's body.

As described above, a user 110 can position the mobile device 102 on her body, and go about her daily life. As an example, as shown in FIG. 2A, the mobile device 102 can be a wearable electronic device or wearable computer (e.g., a smart watch), that is secured to a wrist 202 of the user 110. The mobile device 102 can be secured to the user 110, for example, through a band or strap 204 that encircles the wrist 202. Further, the orientation of the mobile device 102 can differ, depend on the location at which is it placed on the user's body and the user's positioning of her body. As an example, the orientation 206 of the mobile device 102 is shown in FIG. 2A. The orientation 206 can refer, for example, to a vector projecting from a front edge of the mobile device 102 (e.g., the y-axis shown in FIG. 2B).

Although an example mobile device 102 and an example position of the mobile device 102 is shown, it is understood that these are merely illustrative examples. In practice, the mobile device 102 can be any portable electronic device for receiving, processing, and/or transmitting data, including but not limited to cellular phones, smart phones, tablet computers, wearable computers (e.g., smart watches), and the like. As an example, the mobile device 102 can be implemented according to the architecture 300 shown and described with respect to FIG. 3. Further, in practice, the mobile device 102 can be positioned on other locations of a user's body (e.g., arm, shoulder, leg, hip, head, abdomen, hand, foot, or any other location).

In an example usage of the system 100, a user 110 positions the mobile device 102 on her body, and goes about her daily life. This can include, for example, walking, running, bicycling, sitting, laying down, participating in a sport or athletic activity (e.g., basketball, volleyball, etc.), or any other physical activity. During this time, the mobile device 102 collects sensor data regarding movement of the mobile device 102, an orientation of the mobile device 102, and/or other dynamic properties of the mobile device 102 and/or the user 110.

Figure 2B:
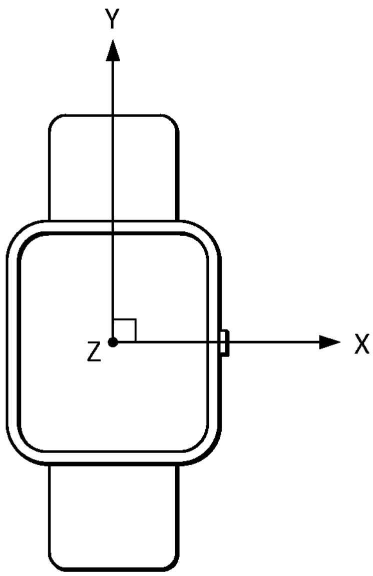
FIG. 2B is a diagram showing example directional axes with respect a mobile device.

For instance, using the motion sensors 310 shown in FIG. X2 (e.g., one or more accelerometers), the mobile device 102 can measure an acceleration experienced by the motion sensors 310, and correspondingly, the acceleration experienced by the mobile device 102. Further, using the motion sensors 310 (e.g., one or more compasses, gyroscopes, inertia measurement units, etc.), the mobile device 102 can measure an orientation of the motion sensors 310, and correspondingly, an orientation of the mobile device 102. In some cases, the motion sensors 310 can collect data continuously or periodically over a period of time or in response to a trigger event. In some cases, the motion sensors 310 can collect motion data with respect to one or more specific directions relative to the orientation of the mobile device 102. For example, the motion sensors 310 can collect sensor data regarding an acceleration of the mobile device 102 with respect to the x-axis (e.g., a vector projecting from a side edge of the mobile device 102, as shown in FIG. 2B), the y-axis (e.g., a vector projecting from a front edge of the mobile device 102, as shown in FIG. 2B) and/or the z-axis (e.g., a vector projecting from a top surface or screen of the mobile device 102, as shown in FIG. 2B), where the x-axis, y-axis, and z-axis refer to a Cartesian coordinate system in a frame of reference fixed to the mobile device 102 (e.g., a "body" frame).

Based on this information, the system 100 determines whether the user 110 has fallen, and if so, whether the user 110 may be in need of assistance.

As an example, the user 110 may stumble fall to the ground. Further, after falling, the user 110 may be unable to stand again on her own and/or may have suffered from an injury as a result of the fall. Thus, she may be in need of assistance, such as physical assistance in standing and/or recovering from the fall, medical attention to treat injuries sustained in the fall, or other help. In response, the system 100 can automatically notify others of the situation. For example, the mobile device 102 can generate and transmit a notification to one or more of the communications devices 106 to notify one or more users 112 (e.g., caretakers, physicians, medical responders, emergency contact persons, etc.) of the situation, such that they can take action. As another example, the mobile device 102 can generate and transmit a notification to one or more bystanders in proximity to the user (e.g., by broadcasting a visual and/or auditory alert), such they can take action. As another example, the mobile device 102 can generate and transmit a notification to the server computer system 104 (e.g., to relay the notification to others and/or to store the information for future analysis). Thus, assistance can be rendered to the user 110 more quickly and effectively.

In some cases, the system 100 can determine that the user 110 has experienced an external force, but has not fallen and is not in need of assistance. As an example, the user 110 may experiences vibrations and/or jostling while riding a bicycle (e.g., due to roughness of a road or trail surface), but has not fallen and can continue biking without assistance from others. As an example, the user 110 may have experience impacts during an athletic activity (e.g., bumped by another user while playing basketball, struck a ball or the ground while playing volleyball, etc.), but has not fallen due to the impact and is able to recover without assistance from others. Accordingly, the system 100 can refrain from generating and transmitting a notification to others.

In some cases, the system 100 can determine that the user 110 has fallen, but that the user is not in need of assistance. As an example, the user 110 may have fallen as a part of an athletic activity (e.g., fallen while biking), but is able to recover without assistance from others. Accordingly, the system 100 can refrain from generating a notification and/or transmitting a notification to others.

In some cases, the system 100 can make these determinations based on sensor data obtained before, during, and/or after an impact experienced by the user 110. For example, the mobile device 102 can collect sensor data (e.g., acceleration data, orientation data, location data, etc.), and the system 100 can use the sensor data to identify a point in time at which the user experienced an impact. Further, the system 100 can analyze the sensor data obtained during the impact, prior to the impact, and/or after the impact to determine whether the user has fallen, and if so, whether the user may be in need of assistance.

In some implementations, the system 100 can make these determinations based on contextual information, such as the activity that the user was performing at or around the time the user experienced an impact or other force. This be can be beneficial, for example, in improving the accuracy and/or sensitivity by which the system 100 can detect falls.

For instance, the system 100 can determine whether a user has fallen (and whether the user is in need of assistance) using different sets of rules or criteria, depending on the activity that the user was perform at or around the time that she experienced an impact or other force. As an example, the system 100 can determine that the user was performing a first activity (e.g., walking) and determine whether a user has fallen based on a first set of rules or criteria specific to that first activity. As another example, the system 100 can determine that the user was performing a second activity (e.g., biking) and determine whether a user has fallen based on a first set of rules or criteria specific to that second activity. As another example, the system 100 can determine that the user was performing a third activity (e.g., playing basketball) and determine whether a user has fallen based on a first set of rules or criteria specific to that third activity. Each set of rules or criteria can be specifically tailored to its corresponding activity, such that false positives and/or false negatives are reduced.

In some implementations, the system 100 can utilize a first set of rules or criteria by default (e.g., a default set of rules or criteria for determining whether a user has fallen). Upon determining that the user is performing a particular activity, the system 100 can utilize a set of rules or criteria that is specific to that activity. Further, upon determining that the user has ceased performing that activity, the system 100 can revert to the first set of rules or criteria.

As an example, in some implementations, the system 100 can utilize a default set of rules or criteria for detecting whether the user has fallen during frequent day to as activities, such as walking, climbing stairs, etc. Upon determining that the user is biking, the system 100 can utilize a specialized set of rules or criteria that are specific to detecting whether the user has fallen while biking. Further, upon determining that the user is participating in an activity in which user commonly experiences large impacts (e.g., volleyball, basketball, etc.), the system 100 can utilize another specialized set of rules or criteria that are specific to detecting whether the user has fallen while participating on that activity. Further, upon determining that the user is no longer participating in activity for which the system 100 has specialized sets of rules or criteria, the system 100 can revert to using the default set of rules or criteria for determining whether the user has fallen.

In some implementations, the system 100 can determine whether a user has fallen (and whether the user is in need of assistance) using a state machine having several states, where each state corresponds to a different type of activity and a different corresponding set of criteria.

Figure 3:
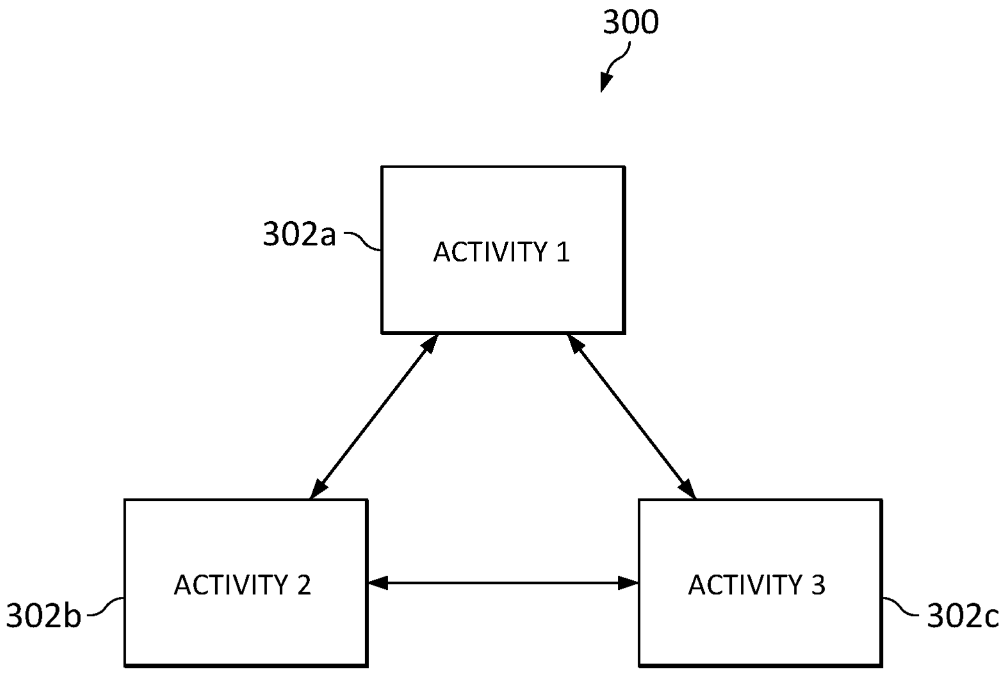
FIG. 3 is a diagram of an example state machine for determining whether a user has fallen and/or requires assistance

An example state machine 300 is shown in FIG. 3. In this example, the state machine includes three states 302*a*-302*c*, each corresponding to a different type of activity, and each being associated with a different set of rules or criteria for determining whether the user has fallen and/or whether the user is in need of assistance.

As an example, the first state 302*a* can correspond to a default activity. Further, first state 302*a* can be associated with a default set of rules or criteria for determining whether a user has fallen and/or whether the user is in need of assistance. In some implementations, the default activity can correspond to one or more of walking, jogging, running, standing, and/or sitting.

As another example, the second state 302*b* can correspond to a biking activity. Further, the second state 302*b* can be associated with a set of rules or criteria for determining whether a user has fallen and/or whether the user is in need of assistance, specifically in the context of biking.

As another example, the second state 302*c* can correspond to an activity in which user commonly experiences large impacts (e.g., volleyball, basketball, etc.). Further, the third state 302*c* can be associated with a set of rules or criteria for determining whether a user has fallen and/or whether the user is in need of assistance, specifically in the context of high impact activities.

In an example operation, the system 100 is initially set to a default state (e.g., the first state 302*a*) and determines whether a user has fallen and/or whether the user is in need of assistance based on the default set of rules or criteria that is associated with that state.

Upon determining that the user is performing a different activity, the system 100 transitions to the state corresponding to that activity, and determines whether a user has fallen and/or whether the user is in need of assistance based on the set of rules or criteria that is associated with that new state.

For example, upon determining that the user is biking, the system 100 can transition from the first state 302*a* to the second state 302*b*, and can determine whether a user has fallen and/or whether the user is in need of assistance based on the set of rules or criteria that is associated with the second state 302*b*.

For example, upon determining that the user has ceased biking and is instead playing basketball, the system 100 can transition from the second state 302*b* to the third state 302*c*, and can determine whether a user has fallen and/or whether the user is in need of assistance based on the set of rules or criteria that is associated with the third state 302*c*.

Upon determining that the user is no longer performing an specialized activity (e.g., an activity that is not associated with a state other than the default first state 302*a*), the system 100 transitions back to the default first state 302*a*, and determines whether a user has fallen and/or whether the user is in need of assistance based on the default set of rules or criteria that is associated with that state.

Although the state machine 200 shown in FIG. 2 includes three states, this is merely an illustrative example. In practice, a state machine can include any number of states corresponding to any number of activities (and in turn, any number of different sets of rules or criteria).

In implementations, the system 100 can determine the type of activity being performed by a user based on sensor data obtained by the mobile device 102, such as location data, acceleration data, and/or orientation data For example, each type of activity may be identified by detecting certain characteristics or combinations of characteristics the sensor data that are indicative of that type of activity. For example, a first type of activity may correspond to sensor data having a first set of characteristics, a second type of activity may correspond to sensor data having a second set of characteristics, a third type of activity may correspond to sensor data having a third set of characteristics, and so forth. The system 100 can identify type of activity being performed by a user by obtaining sensor data from the mobile device 102, and determining that the sensor data exhibits a particular set of characteristics.

As an example, the system 100 can determine whether the user is biking based on the distance that a user traveled and/or speed that which the user traveled prior to the impact (e.g., based on output from a location sensor, such as a GPS sensor). For example, a greater distance and/or a higher speed (e.g., greater than certain threshold values) may indicate that the user is biking, whereas a lower distance and/or a lower speed (e.g., less than certain threshold values) may indicate that that the user is walking.

As another example, the system 100 can determine whether the user is biking based on sensor measurements from an accelerometer and/or orientation sensor (e.g., gyroscope) of the mobile device 102. For example, a user might experience certain types of impacts and/or change the orientation of her body (e.g., her wrist) in certain ways while biking, and experience different types of impacts and/or change the orientation of her body in different ways while walking.

As another example, the system 100 can determine whether the user is performing an activity in which user commonly experiences large impacts (e.g., volleyball, basketball, etc.) based on sensor measurements from an accelerometer and/or orientation sensor (e.g., gyroscope) of the mobile device 102. For example, when a user plays volleyball, a user may commonly move her arm or wrist (to which the mobile device 102 is attached) according to a distinctive pattern. The system 100 can determine, based on the sensor data, whether the user is moving her arm or wrist according to that pattern, and if so, determine that the user is playing volleyball.

In some implementations, the system 100 can determine whether the user is performing a particular activity based on manual user input. For example, prior to or during the performance of an activity, a user can manually identify that activity to the mobile device 102 and/or system 100. For example, prior to biking, a user can input data (e.g., to the mobile device 102) indicating that she is about to go biking. Based on the user input, the system 100 can determine that the user will be biking. In some implementations, a user can provide input to a mobile device 102 by selecting a particular activity (e.g., from a list or menu on candidate activities). In some implementations, a user can provide input to a mobile device 102 by selecting a particular application or feature of the mobile device 102 that is specific to or otherwise associated with that activity (e.g., an exercise application or feature).

Although example techniques for identifying a user's activity are described herein, these are merely illustrative examples. In practice, other techniques also can be performed to identify a user's activity, either instead of or in addition to those described herein.

As described above, the system 100 can utilize a context-specific set or rules or criteria for determining whether a user has fallen (and whether the user is in need of assistance) while the user performs certain activities, such as biking.

In general, the context-specific sets or rules or criteria can pertain to sensor data obtained by the mobile device 102 worn by the user. As an example, the sets or rules or criteria can pertain to location data obtained by one or more location sensors (e.g., one or more GPS sensors), acceleration data (e.g., impact data) obtained by one or more accelerometers, and/or orientation data obtained by one or more orientation sensors (e.g., gyroscopes, inertial measurement units, etc.). Certain combinations of measurements may indicate that, in certain contexts, a user has fallen and may be in need of assistance.

As an example, a mobile device 102 can be worn by a user on her wrist by biking. Further, the mobile device 102 can obtain sensor data representing the orientation of the mobile device 102 (and correspondingly, the orientation of the user's wrist or arm) and the acceleration experienced by the mobile device (e.g., representing movements of the user's wrist or arm) prior to, during, and after an impact. In a biking context, sensor measurements indicating that user has (i) changed the orientation of her wrist by a large degree (e.g., greater than a threshold amount) and (ii) moved her wrist or arm by a large degree (e.g., greater than a threshold amount) may be indicative that the user has fallen.

In contrast, sensor measurements indicating that user has (i) changed the orientation of her wrist by a small degree (e.g., not greater than a threshold amount) and (ii) moved her wrist or arm by a large degree (e.g., greater than a threshold amount) may be indicative that the user is biking on rough terrain but has not fallen.

Further, sensor measurements indicating that user has (i) changed the orientation of her wrist by a large degree (e.g., not greater than a threshold amount) and (ii) moved her wrist or arm by a small degree (e.g., not greater than a threshold amount) may be indicative that the user is signaling or performing a gesture, and has not fallen.

Further, sensor measurements indicating that user has (i) changed the orientation of her wrist by a small degree (e.g., not greater than a threshold amount) and (ii) moved her wrist or arm by a small degree (e.g., not greater than a threshold amount) may be indicative that the user is static and has not fallen.

As another example, in a biking context, sensors measurements indicating that the user (i) has traveled a large distance (e.g., greater than a threshold distance) prior to an impact, (ii) experienced highly directional impacts over time (e.g., a variation, spread, or range of impact directions that is less than a threshold level), and (iii) rotated her wrist a small amount (e.g., less than a threshold amount) may indicate that the user is biking normally, and has not fallen. However, sensor measurement indicating that the user (i) has traveled a short distance (e.g., less than a threshold distance) after an impact, (ii) experienced impacts with respect to a wide range of directions over time (e.g., a variation, spread, or range of impact directions that is greater than a threshold level), and (iii) rotated her wrist a large amount (e.g., greater than a threshold amount) may indicate that the user has fallen while biking.

Figure 4A:
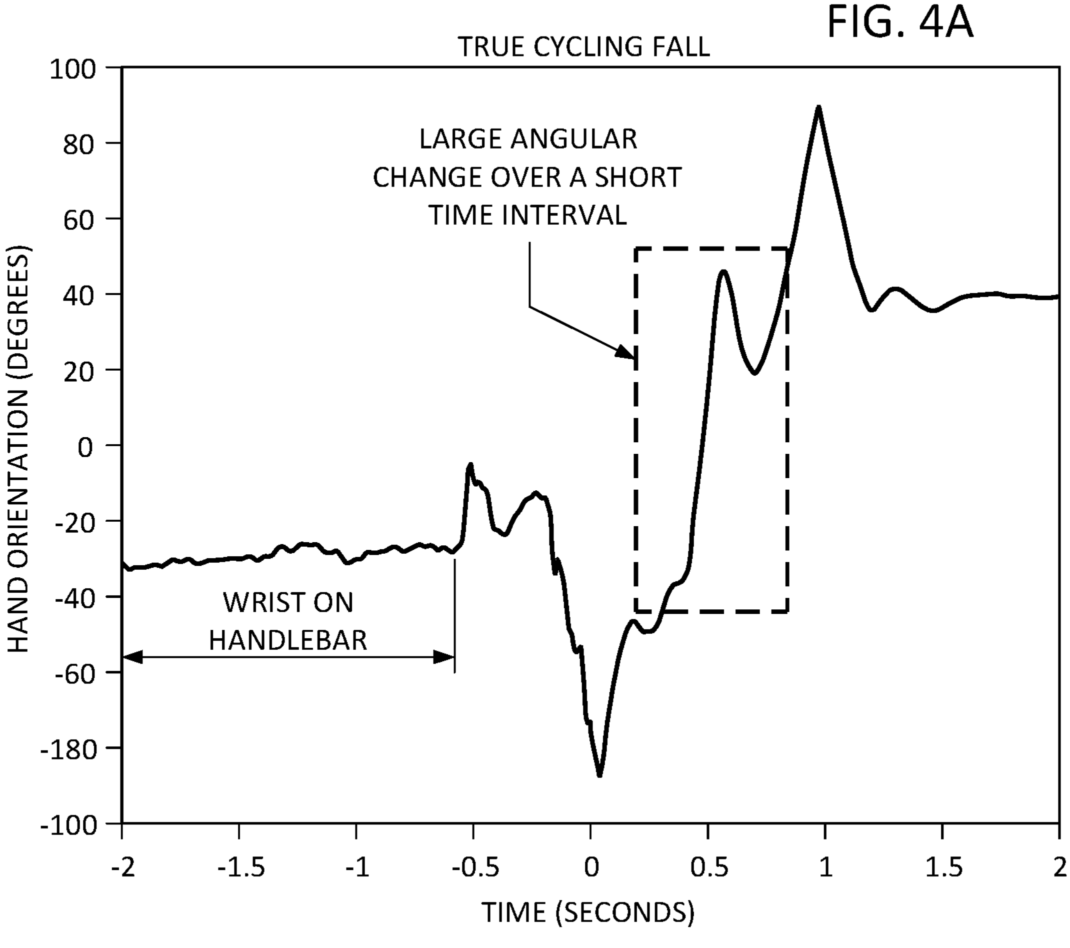
FIGS. 4A and 4B are diagrams of example sensor data obtained by a mobile device.

For instance, FIG. 4A shows sensor data 400 representing the orientation of a mobile device that is worn of a user's wrist while bicycling, measured over a 4 second time window (e.g., extending from two seconds prior to the user experiencing an impact at time 0, until two seconds after the user experiencing the impact). In this example, the orientation of the mobile device (and in turn, the orientation of the user's hand and/or wrist) is relatively stable during the time prior to the impact. However, upon the user experiencing the impact, the orientation of the mobile device exhibits a large angular change over a short time interval (e.g., approximately 0.1 second). Further, the orientation of the mobile device exhibits a large angular change over the entire time window.

These characteristics may be indicative of a fall. For example, a system 100 can determine that the user has fallen from her bicycle if (i) the angular change in the orientation of the mobile device over the time window (e.g., a 4 second window) is greater than a first threshold amount $\theta_1$, and (ii) the angular change in the orientation of the mobile device over a subset of that time window (e.g., a 0.1 second subset of the 4 second time window) is greater than a second threshold amount $\theta_2$. Otherwise, the system 100 can determine that the user has not fallen from her bicycle.

Figure 4B:
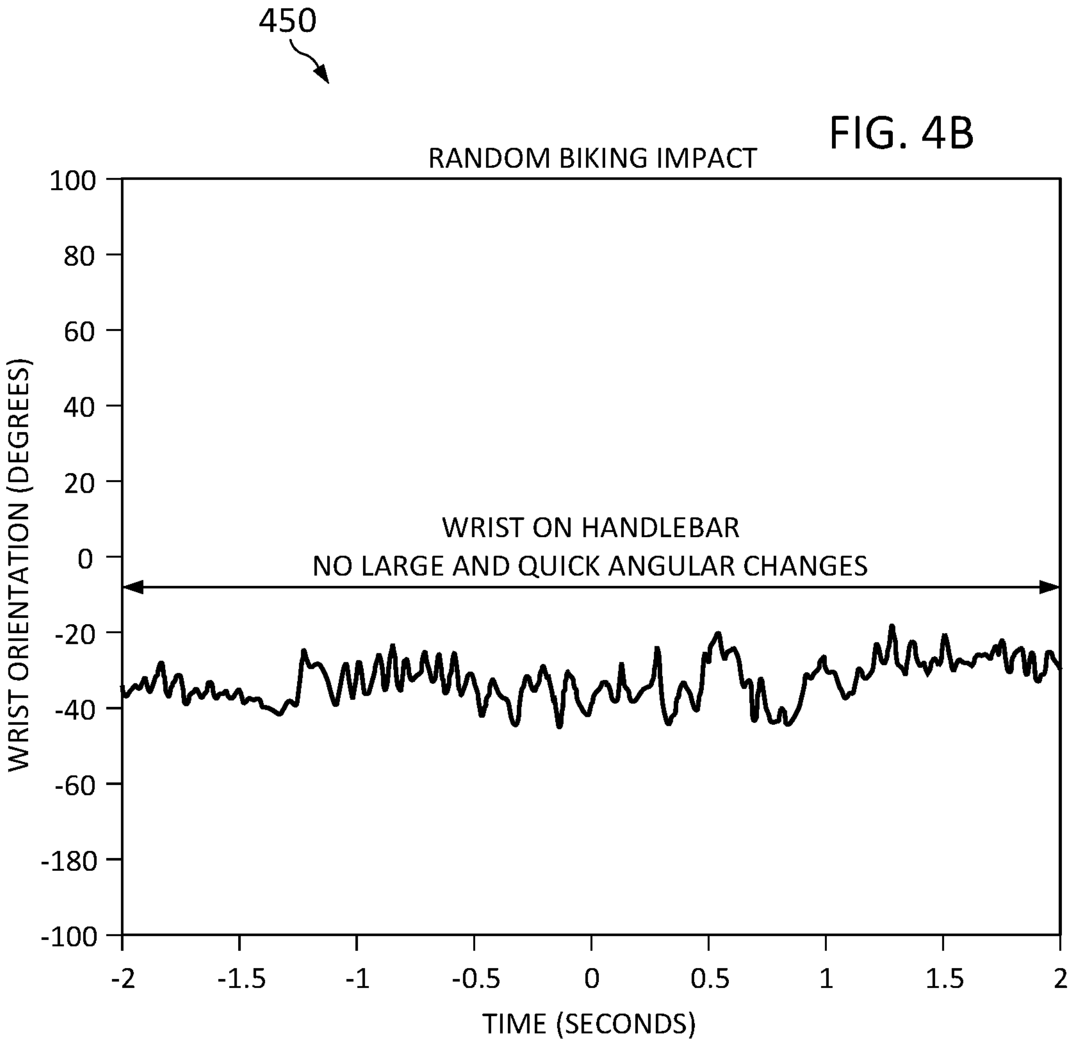

FIG. 4B shows additional sensor data 450 representing the orientation of a mobile device that is worn of a user's wrist while bicycling, measured over a 4 second time window (e.g., extending from two seconds prior to the user experiencing an impact at time 0, until two seconds after the user experiencing the impact). In this example, the orientation of the mobile device (and in turn, the orientation of the user's hand and/or wrist) is relatively stable during the entirety time window.

These characteristics may indicate that the user has not fallen. For example, a system 100 can determine that the user has not fallen from her bicycle if (i) the angular change in the orientation of the mobile device over the time window (e.g., a 4 second window) is not greater than a first threshold amount $\theta_1$, and/or (ii) the angular change in the orientation of the mobile device over a subset of that time window (e.g., a 0.1 second subset of the 4 second time window) is not greater than a second threshold amount $\theta_2$.

In practice, the time window, the subset of the time window, and the threshold amounts can differ, depending on the implementation. For example, the time window, the subset of the time window, and the threshold amounts can be tunable values that are selected based on experimental studies of the characteristics of users' movements while riding bicycles.

As another example, a system 100 can determine that a user has fallen by biking upon receiving sensor measurements indicating that the user (i) experienced vibrations that are characteristic of bicycling prior to the impact, and (ii) has not experienced vibrations that are characteristic of bicycling within a particular time interval after the impact (e.g., within a threshold time interval T). In contrast, the system 100 determine that a user has not fallen upon receiving sensor measurements indicating that the user (i) experienced vibrations that are characteristic of bicycling prior to the impact, and (ii) has again experienced vibrations that are characteristic of bicycling within the particular time interval after the impact (e.g., within the threshold time interval T).

As another example, while biking, a user may orient her wrist differently, depending on the configuration of her bicycle's handlebars. The system 100 can infer the configuration of the handlebars, and apply different sets of rules or criteria for each configuration.

Figure 5:
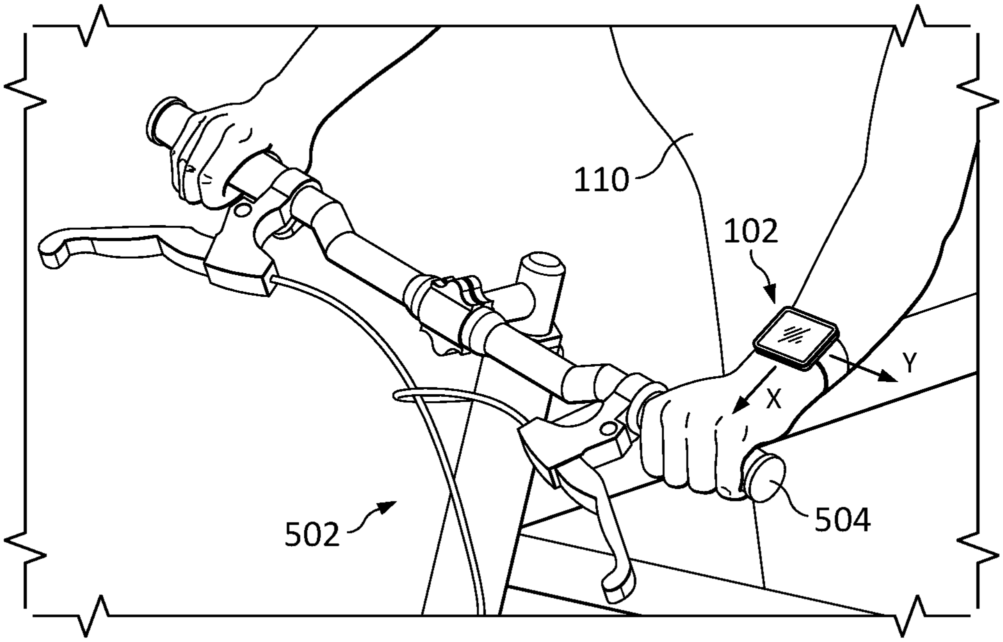
FIG. 5 is a diagram of an example bicycle and a user wearing a mobile device.

For instance, FIG. 5 shows an example bicycle 502 having horizontal (or approximately horizontal) handlebars 504. In this example, the user 110 is wearing the mobile device 102 on one of her wrists, and is grasping the handlebars 504 with her hands. The x-axis and y-axis of the mobile device 102 are shown extending from the mobile device 102. The y-direction extends along (or approximately along) the handlebars 504, the x-direction extends along (or approximately along) the user's arm, and the z-direction (not shown) extends perpendicular to a face of the mobile device 102). Sensor measurements indicating that the user experienced a high intensity impact (e.g., greater than a threshold level) in a Y-direction may indicate that the user has fallen while biking. However, sensor measurements indicating that the user experienced a low intensity impact (e.g., less than the threshold level) in the Y-direction may indicate that the user is biking normally, and has not fallen.

Figure 6A:
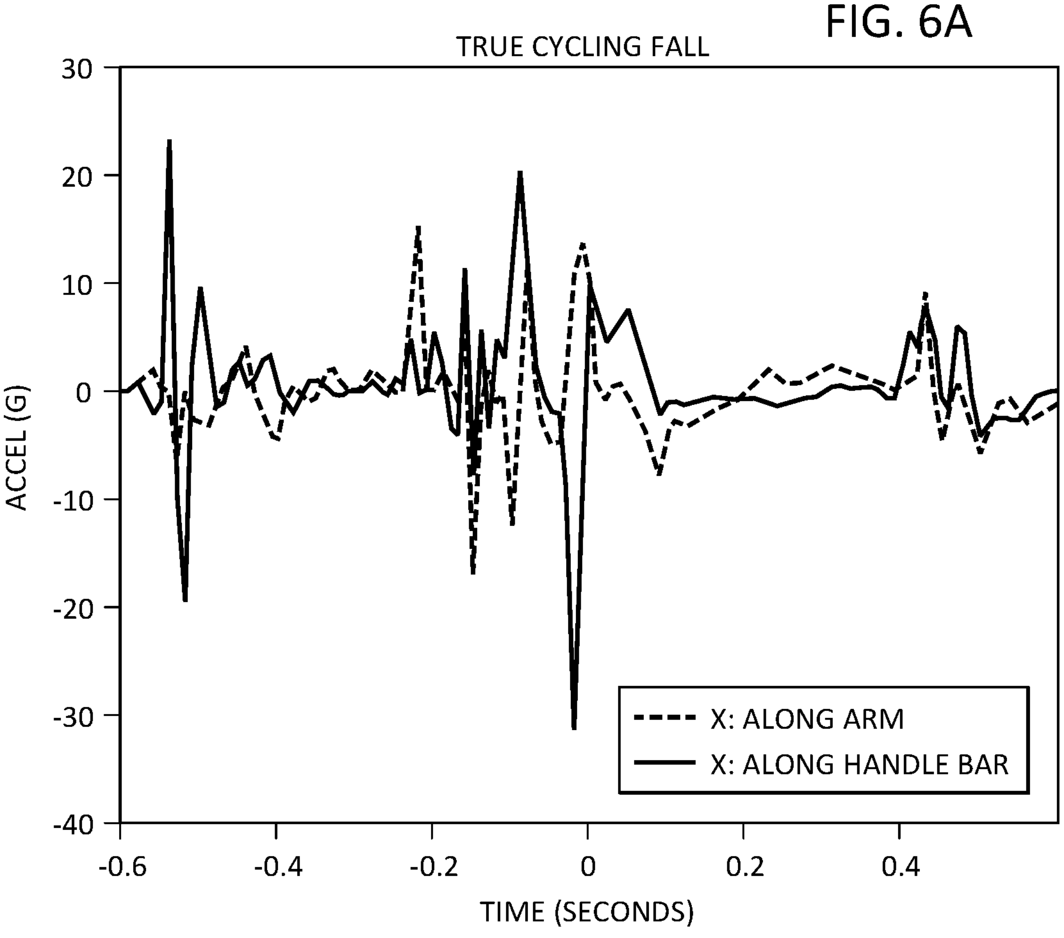
FIGS. 6A and 6B are diagrams of additional example sensor data obtained by a mobile device.

As an example, FIG. 6A shows sensor data 600 representing the acceleration of a mobile device that is worn of a user's wrist while bicycling, measured in the x-direction and the y-direction over a 1.2 second time window (e.g., extending from 0.6 seconds prior to the user experiencing an impact at time 0, until 0.6 seconds after the user experiencing the impact). In this example, the mobile device (and in turn, the user) experienced a high intensity impact in both the x-direction and y-direction (e.g., above a threshold intensity level), which may be characteristic of the user falling.

Figure 6B:
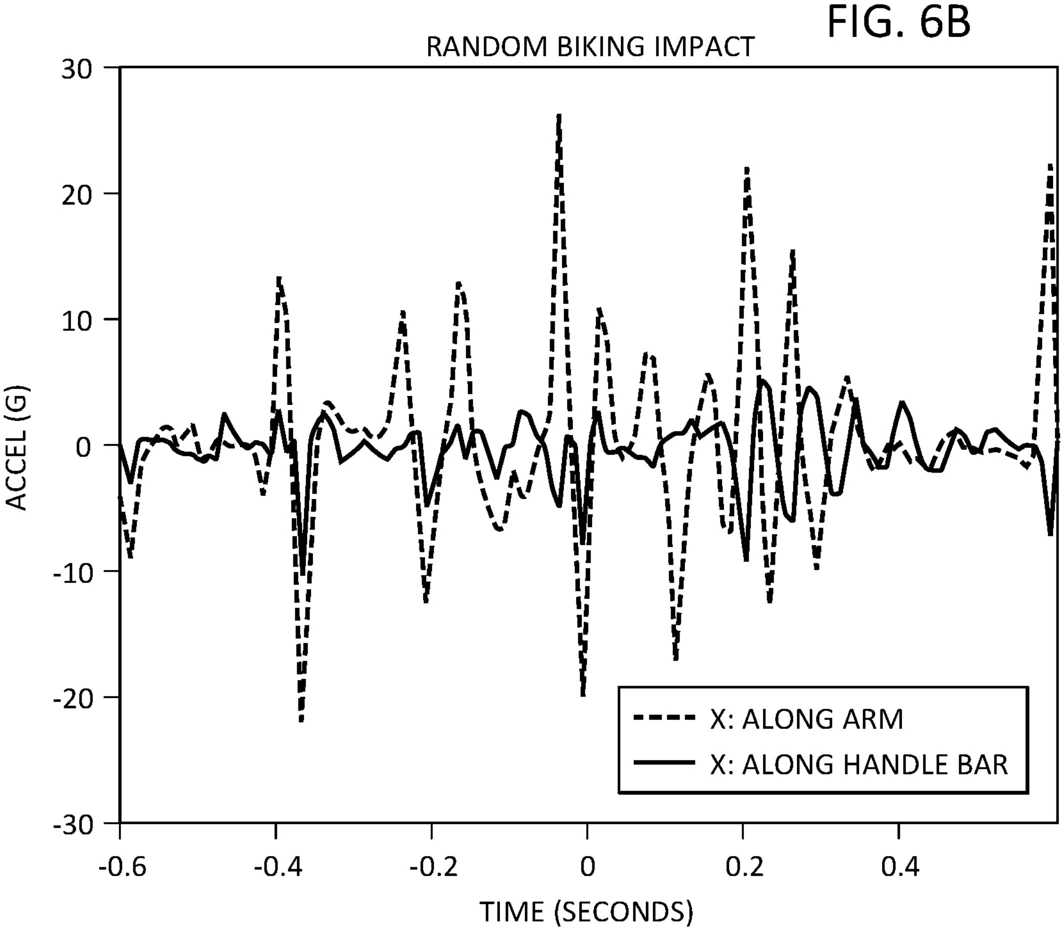

As another example, FIG. 6B shows sensor data 620 representing the acceleration of a mobile device that is worn of a user's wrist while bicycling, measured in the x-direction and y-direction over a 1.2 second time window (e.g., extending from 0.6 seconds prior to the user experiencing an impact at time 0, until 0.6 seconds after the user experiencing the impact). In this example, the mobile device (and in turn, the user) experienced a high intensity impact in the x-direction (e.g., in the direction along the user's arm). However, the mobile device (and in turn, the user) did not experience a high intensity impact in the y-direction (e.g., in a direction along the handlebars). This may be indicative of the user not falling.

For instance, a system 100 can determine that the user has fallen from her bicycle if (i) the intensity of the impact experienced in a x-direction is greater than a first threshold amount $I_1$, and (ii) the intensity of the impact experienced in a y-direction is greater than a second threshold amount $I_2$. Otherwise, the system 100 can determine that the user not fallen. In practice, the threshold amounts can differ, depending on the implementation. For example, the threshold amounts can be tunable values that are selected based on experimental studies of the characteristics of users' movements while riding bicycles.

Figure 7:
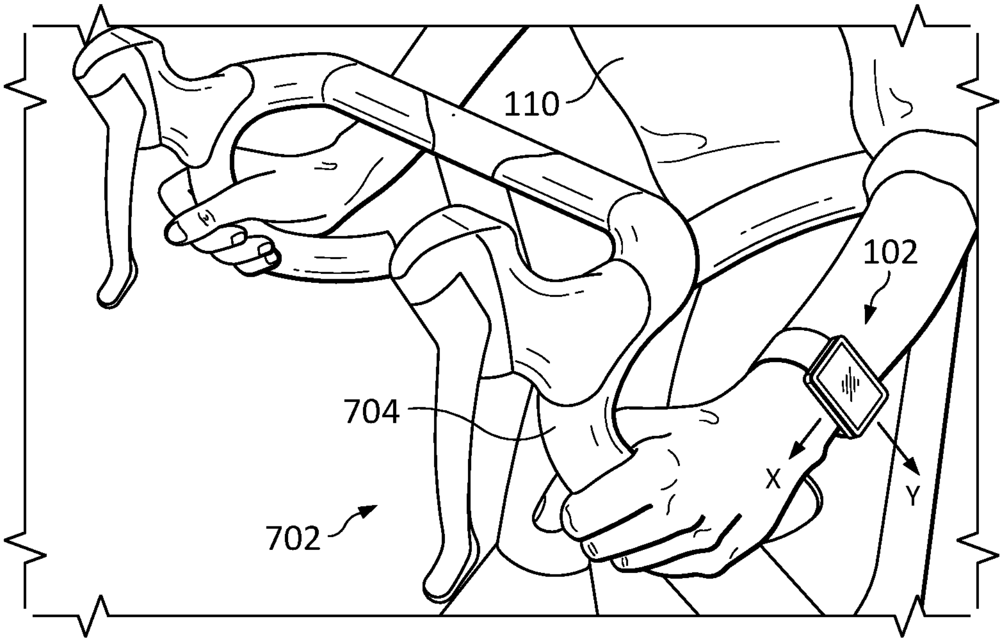
FIG. 7 is a diagram of another example bicycle and a user wearing a mobile device.

Further, FIG. 7 shows another example bicycle 702 having vertical (or approximately vertical) handlebars 704. In this example, the user 110 is wearing the mobile device 102 on one of her wrists, and is grasping the handlebars 454 with her hands. The x-axis and y-axis of the mobile device 102 are shown extending from the mobile device 102. The y-direction extends along (or approximately along) the handlebars 704, the x-direction extends along (or approximately along) the user's arm, and the z-direction (not shown) extends perpendicular to a face of the mobile device 102). Sensor measurements indicating that the user (i) has moved her hand chaotically, (ii) experienced a high intensity impact (e.g., greater than a first threshold level $l_1$) in a Y-direction, and (iii) a high intensity impact (e.g., greater than a second threshold level $l_2$) in a Z-direction may indicate that the user has fallen while biking. However, sensor measurement indicating that the user (i) has maintained her hand is a stable vertical direction, (ii) experienced a high intensity impact (e.g., greater than the first threshold level $l_1$) in a Y-direction, and (iii) a low intensity impact (e.g., lower than the second threshold level $l_2$) in a Z-direction may indicate that the user is biking normally, and has not fallen.

For example, a system 100 can determine that a user has fallen by biking upon receiving sensor measurements indicating that (i) the variation, spread, or range of the directions of orientation of the mobile device 102 is greater than a threshold level (e.g., indicative of chaotic movement by the user), (ii) the mobile device experienced a high intensity impact (e.g., greater than the threshold level $l_1$) in a Y-direction, and (iii) the mobile device experience a high intensity impact (e.g., greater than the second threshold level $l_2$) in a Z-direction.

As another example, a system 100 can determine that user has maintained her hand is a stable vertical direction by determining that (i) the variation, spread, or range of the orientation of the mobile device 102 is not greater than a threshold level, and (ii) the angle between the y-direction of the mobile device 102 and the vertical direction is less than a threshold angle $\theta_T$. Further, upon additionally determining that (i) the mobile device experienced a high intensity impact (e.g., greater than the threshold level $l_1$) in a Y-direction, and (iii) the mobile device experience a low intensity impact (e.g., not greater than the second threshold level $l_2$) in a Z-direction, the system 100 can determine that this user has not fallen while biking.

As described above, upon determining that a user has fallen and requires assistance, the mobile device 102 can generate and transmit a notification to one or more communications devices 106 to notify one or more users 112 (e.g., caretakers, physicians, medical responders, emergency contact persons, etc.) of the situation, such that they can take action. In some implementations, notification can be generated and transmitted upon the satisfaction of certain criteria in order to reduce the occurrence of false positives.

Figure 8:
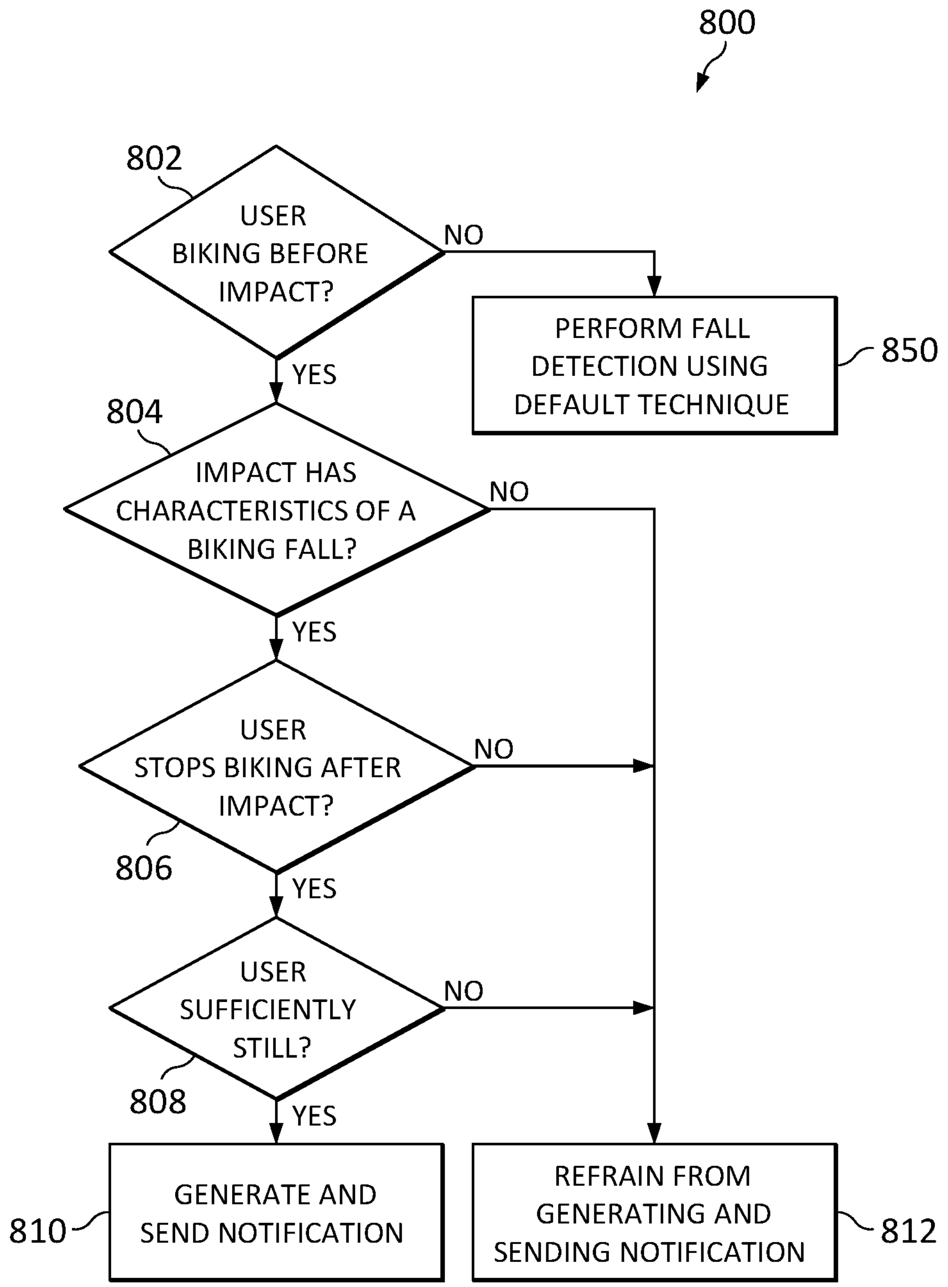
FIG. 8 is a flow char diagram of an example process for generating and transmitting notifications.

For instance, FIG. 8 shows an example process 800 for generating and transmitting a notification in response to a user falling.

In the process 800, a system (e.g., the system 100 and/or the mobile device 102) determines whether a user was biking before experiencing an impact (block 802). The system can make this determination based on sensor data obtained by a mobile device worn by the user (e.g., as described above).

If the system determines that the user was not biking, the system can detect whether a user has fallen using a default technique (block 850). For example, referring to FIG. 3, the system can detect whether a user has fallen according to a default set of rules of criteria that are not specific to biking.

If the system determines that the user was biking, the system determines whether the impact has characteristics off a biking fall (block 802). The system can make this determination based on sensor data obtained by a mobile device worn by the user (e.g., as described above).

If the system determines that the impact does not have characteristics off a biking fall, the system refrains from generating and transmitting a notification (block 812).

If the system determines that the impact has the characteristics of a biking fall, the system determines whether the user has stopped biking after the impact (block 806). The system can make this determination based on sensor data obtained by a mobile device worn by the user (e.g., as described above).

If the system determines that the user has not stopped biking after the impact, the system refrains from generating and transmitting a notification (block 812).

If the system determines that the user has stopped biking after the impact, the system determines whether the user has remained sufficiently still for a period of time (e.g., a one minute time interval) after the impact (block 808). The system can make this determination based on sensor data obtained by a mobile device worn by the user (e.g., by determining whether the mobile device has moved more than a threshold distance, changed its orientation by more than a threshold angle, moved for a length of time greater than a threshold amount of time, etc.).

If the system determines that the user has not remained sufficiently still for the period of time, the system refrains from generating and transmitting a notification (block 812).

If the system determines that the user has remained sufficiently still for the period of time, the system generates and transmit a notification (block 810).

In some implementations, upon detecting that a user has fallen, the mobile device 102 can determine whether a user remains immobile after the fall for a particular time interval (e.g., 30 seconds). Upon determining that user has remained immobile, the mobile device 102 present an alert notification to the user, including an option to generate and transmit a notification (e.g., an emergency responder) and an option to refrain from generating and training a notification. An example of this alert notification is shown in FIG. 9A.

If the user does not provide any input within a particular time interval (e.g., within 60 seconds after the fall), the mobile device 102 can present an alert notification to the user showing a count down, and indicating that a notification will be generated and transmitted upon expiration of the count down, absent input otherwise by the user. An example of this alert notification is shown in FIG. 9B.

Figure 9C:
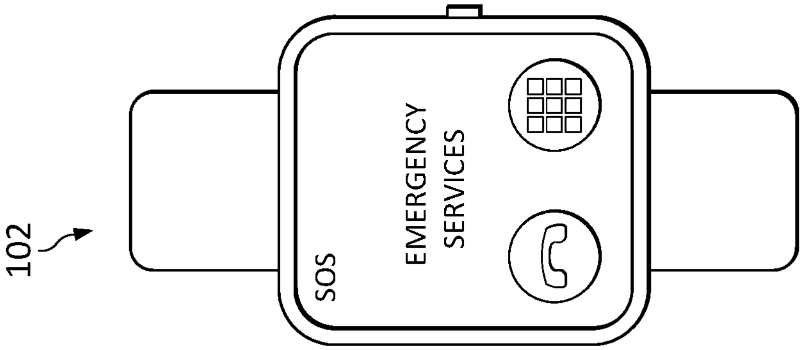
FIGS. 9A-9C are diagrams of example alert notification generated by a mobile device.
Figure 9B:
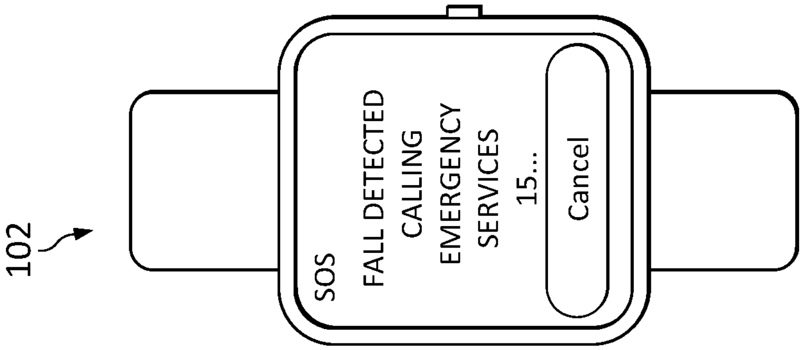
Figure 9A:
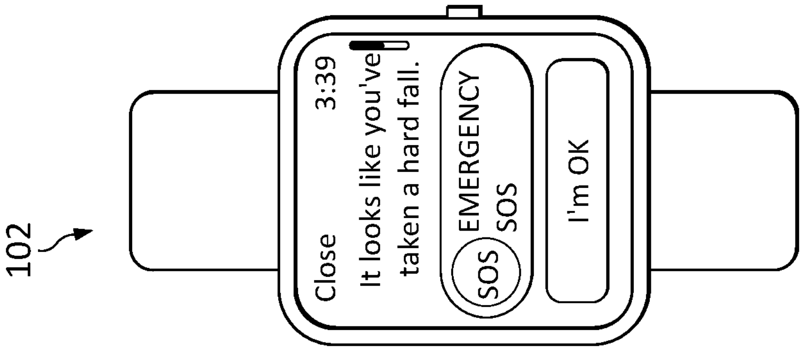
Figure 10:
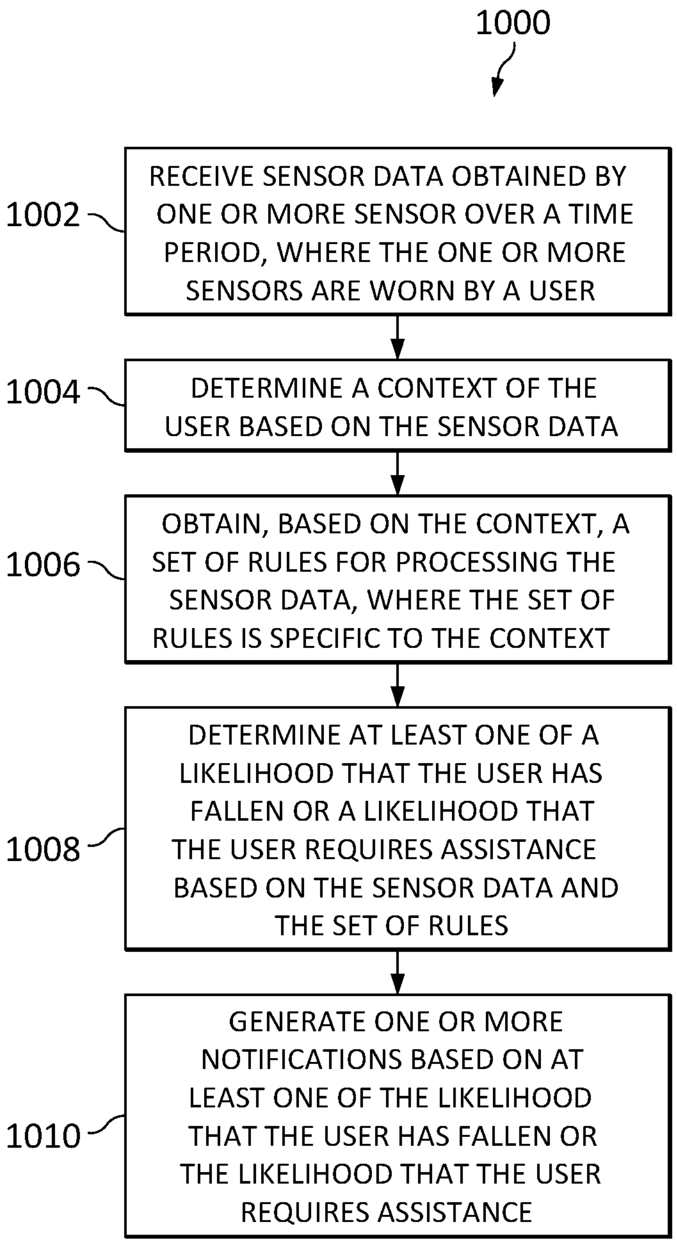
FIG. 10 is a flow chart diagram of an example process for determining whether a user has fallen and/or requires assistance.

Upon expiration of the count down without input from the user, the mobile device 102 generates and transmits a notification (e.g., as shown in FIG. 9C).

This technique can be beneficial, for example, in further reducing the occurrence of false positives and reducing the likelihood that notifications are transmitted to others (e.g., emergency services) in error when the user does not actually require assistance.

Example Processes

An example process 1000 for determining whether a user has fallen and/or may be in need of assistance using a mobile device is shown in FIG. 1000. The process 1000 can be performed for example, using the mobile device 102 and/or the system 100 shown in FIGS. 1 and 2. In some cases, some or all of the process 1000 can be performed by a co-processor of the mobile device. The co-processor can be configured to receive motion data obtained from one or more sensors, process the motion data, and provide the processed motion data to one or more processors of the mobile device.

In the process 1000, a mobile device receives sensor data obtained by one or more sensor over a time period (block 1002). The one or more sensors are worn by a user.

In some implementations, the mobile device can be a wearable mobile device, such as a smart watch.

In some implementations, at least some of the one or more sensors can be disposed on or in the mobile device. In some implementations, at least some of the one or more sensors are remote from the mobile device. For example, the mobile device can be a smart phone, and the sensors can be disposed on a smart watch that is communicatively coupled to the smart phone.

In general, the sensor data can include one or more types of data. For example, the sensor data can include location data obtained by one or more location sensors of the mobile device. As another example, the sensor data can include acceleration data obtained by one or more acceleration sensors of the mobile device. As another example, the sensor data can include orientation data obtained by one or more orientation sensors of the mobile device.

Further, the mobile device determines a context of the user based on the sensor data (block 1004). In some implementations, the context can correspond to a type of activity performed by the user during the time period. Example contexts include bicycling, walking, running, jigging, playing a sport (e.g., basketball, volley, etc.), or any other activity that may be performed by a user.

Further, the mobile device obtains a set of rules for processing the sensor data based on the context (block 1006). The set of rules is specific to the context.

Further, the mobile device determines a likelihood that the user has fallen and/or a likelihood that the user requires assistance based on the sensor data and the set of rules (block 1008).

As described above, the mobile device determines a likelihood that the user has fallen and/or a likelihood that the user requires assistance using sets of rules that are specific to the context. As illustrative examples, sets of rules for a bicycling context are described above.

As an example, determining the likelihood that the user has fallen and/or the likelihood that the user requires assistance can include (i) determining, based on the sensor data, that a distance traveled by the user prior over the period of time is greater than a first threshold value, and (ii) determining, based on the sensor data, that a variation in a direction of impacts experienced by the user over the period of time is less than a second threshold value, (iii) determining, based on the sensor data, that a rotation of the user's wrist over the period of time is less than a third threshold value, and (iv) determining that the user has fallen and/or requires assistance based on the determination that the distance traveled by the user prior over the period of time is greater than the first threshold value, the determination that the variation in a direction of impacts experienced by the user over the period of time is less than the second threshold value, and the determination that the rotation of the user's wrist over the period of time is less than the third threshold value.

As another example, determining the likelihood that the user has fallen and/or the likelihood that the user requires assistance can include (i) determining, based on the sensor data, that a magnitude of an impact experienced by the user over the period of time in a first direction is greater than a first threshold value, and (ii) determining that the user has fallen and/or requires assistance based on the determination that the magnitude of the impact experienced by the user over the period of time in the first direction is greater than the first threshold value.

As another example, determining the likelihood that the user has fallen and/or the likelihood that the user requires assistance can include (i) determining, based on the sensor data, that a change in an orientation of the user's hand over the period of time is greater than a first threshold value, (ii) determining, based on the sensor data, that a magnitude of an impact experienced by the user over the period of time in a first direction is greater than a second threshold value, wherein the first direction is orthogonal to the second threshold value, (iii) determining, based on the sensor data, that a magnitude of an impact experienced by the user over the period of time in a second direction is greater than a third threshold value, and (iv) determining that the user has fallen and/or requires assistance based on the determination that the change in an orientation of the user's hand over the period of time is greater than the first threshold value, the determination that the magnitude of the impact experienced by the user over the period of time in the first direction is greater than the second threshold value, and the determination that the magnitude of an impact experienced by the user over the period of time in the second direction is greater than the third threshold value.

Although example sets of rules for a bicycling context are described above, in practice, other sets of rules also can be used for a bicycling context, either instead of or in addition to those described above. Further, other sets of rules can be used for other contexts, such as walking, running, jogging, playing a sport, etc.

Further, the mobile device generates one or more notifications based on the likelihood that the user has fallen and/or the likelihood that the user requires assistance (block 1010).

In some implementations, generating the one or more notifications can include transmitting a first notification to a communications device remote from the mobile device. The first notification can include an indication that the user has fallen and/or an indication that the user requires assistance. In some implementations, the communications device can be an emergency response system.

In some implementations, the mobile device can perform at least a portion of the process 1000 according to a different context of the user. For example, the mobile device can receive second sensor data obtained by the one or more sensor over a second time period. Further, the mobile device can determine a second context of the user based on the second sensor data, and obtain a second set of rules for processing the sensor data based on the second context, where the second set of rules is specific to the second context. Further, the mobile device can determine at least one of a likelihood that the user has fallen and/or a likelihood that the user requires assistance based on the sensor data and the second set of rules. Further, the mobile device can generate one or more second notifications based on at least one of the likelihood that the user has fallen or the likelihood that the user requires assistance.

Example Mobile Device

Figure 11:
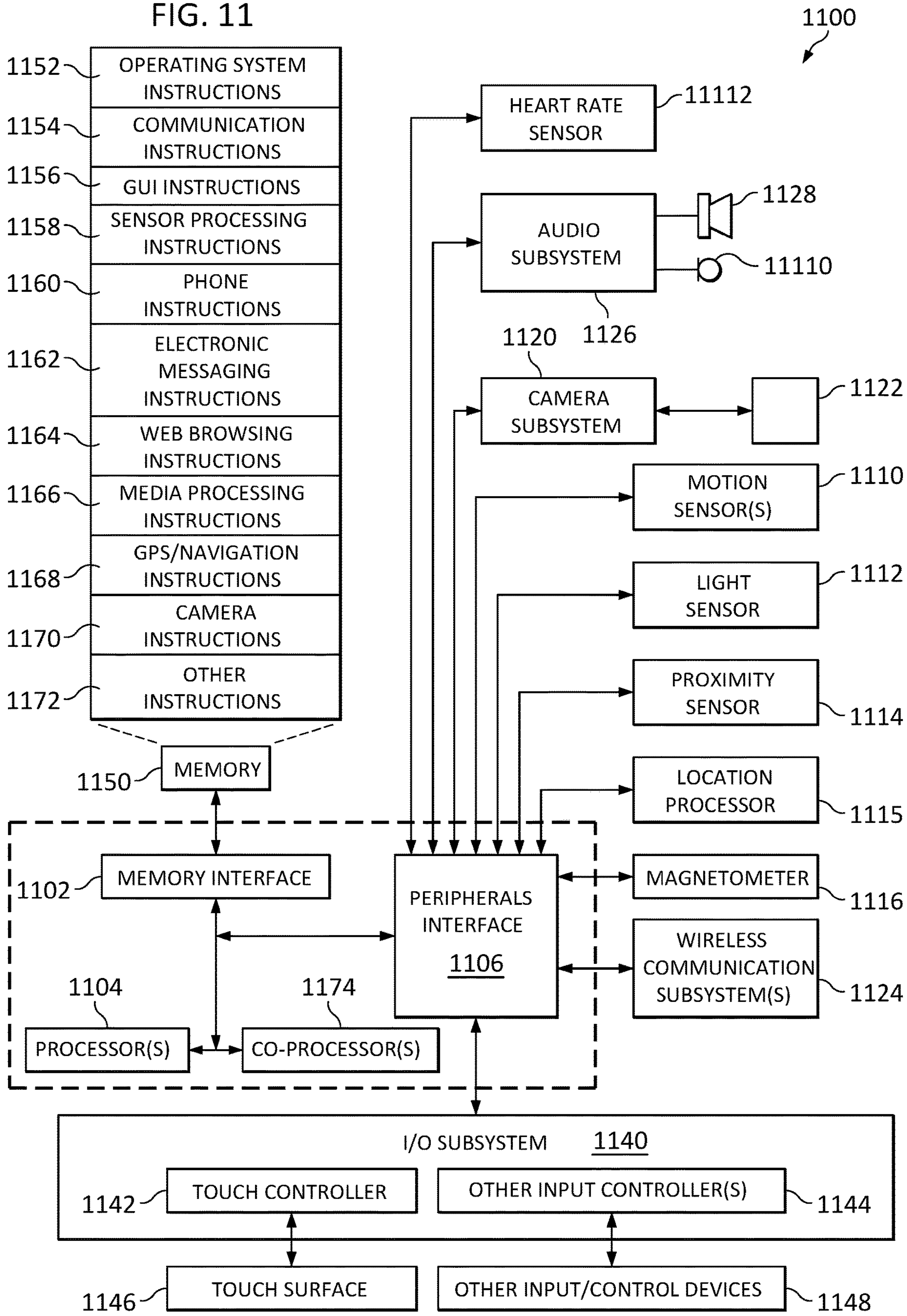
FIG. 11 is a block diagram of an example architecture for implementing the features and processes described in reference to FIGS. 1-11.

FIG. 11 is a block diagram of an example device architecture 1100 for implementing the features and processes described in reference to FIGS. 1-10. For example, the architecture 1100 can be used to implement the mobile device 102, the server computer system 104, and/or one or more of the communications devices 106. Architecture 1100 may be implemented in any device for generating the features described in reference to FIGS. 1-10, including but not limited to desktop computers, server computers, portable computers, smart phones, tablet computers, game consoles, wearable computers, set top boxes, media players, smart TVs, and the like.

The architecture 1100 can include a memory interface 1102, one or more data processor 1104, one or more data co-processors 1174, and a peripherals interface 1106. The memory interface 1102, the processor(s) 1104, the co-processor(s) 1174, and/or the peripherals interface 1106 can be separate components or can be integrated in one or more integrated circuits. One or more communication buses or signal lines may couple the various components.

The processor(s) 1104 and/or the co-processor(s) 1174 can operate in conjunction to perform the operations described herein. For instance, the processor(s) 1104 can include one or more central processing units (CPUs) that are configured to function as the primary computer processors for the architecture 1100. As an example, the processor(s) 1104 can be configured to perform generalized data processing tasks of the architecture 1100. Further, at least some of the data processing tasks can be offloaded to the co-processor(s) 1174. For example, specialized data processing tasks, such as processing motion data, processing image data, encrypting data, and/or performing certain types of arithmetic operations, can be offloaded to one or more specialized co-processor(s) 1174 for handling those tasks. In some cases, the processor(s) 1104 can be relatively more powerful than the co-processor(s) 1174 and/or can consume more power than the co-processor(s) 1174. This can be useful, for example, as it enables the processor(s) 1104 to handle generalized tasks quickly, while also offloading certain other tasks to co-processor(s) 1174 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 1104 for further analysis.

Sensors, devices, and subsystems can be coupled to peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions of the architecture 1100. For example, in some implementations, a light sensor 1112 can be utilized to facilitate adjusting the brightness of a touch surface 1146. In some implementations, a motion sensor 1110 can be utilized to detect movement and orientation of the device. For example, the motion sensor 1110 can include one or more accelerometers (e.g., to measure the acceleration experienced by the motion sensor 1110 and/or the architecture 1100 over a period of time), and/or one or more compasses or gyros (e.g., to measure the orientation of the motion sensor 1110 and/or the mobile device). In some cases, the measurement information obtained by the motion sensor 1110 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 1110 can be directly integrated into a co-processor 1174 configured to processes measurements obtained by the motion sensor 1110. For example, a co-processor 1174 can include one more accelerometers, compasses, and/or gyroscopes, and can be configured to obtain sensor data from each of these sensors, process the sensor data, and transmit the processed data to the processor(s) 1104 for further analysis.

Other sensors may also be connected to the peripherals interface 1106, such as a temperature sensor, a biometric sensor, or other sensing device, to facilitate related functionalities. As an example, as shown in FIG. 11, the architecture 1100 can include a heart rate sensor 11112 that measures the beats of a user's heart. Similarly, these other sensors also can be directly integrated into one or more co-processor(s) 1174 configured to process measurements obtained from those sensors.

A location processor 1115 (e.g., a GNSS receiver chip) can be connected to the peripherals interface 1106 to provide geo-referencing. An electronic magnetometer 1116 (e.g., an integrated circuit chip) can also be connected to the peripherals interface 1106 to provide data that may be used to determine the direction of magnetic North. Thus, the electronic magnetometer 1116 can be used as an electronic compass.

A camera subsystem 1120 and an optical sensor 1122 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 1124. The communication subsystem(s) 1124 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 1124 can depend on the communication network(s) or medium(s) over which the architecture 1100 is intended to operate. For example, the architecture 1100 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 1100 can be configured as a base station for other wireless devices. As another example, the communication subsystems may allow the architecture 1100 to synchronize with a host device using one or more protocols, such as, for example, the TCP/IP protocol, HTTP protocol, UDP protocol, and any other known protocol.

An audio subsystem 1126 can be coupled to a speaker 1128 and one or more microphones 1130 to facilitate voice-enabled functions, such as voice recognition, voice replication, digital recording, and telephony functions.

An I/O subsystem 1140 can include a touch controller 1142 and/or other input controller(s) 1144. The touch controller 1142 can be coupled to a touch surface 1146. The touch surface 1146 and the touch controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 1146. In one implementation, the touch surface 1146 can display virtual or soft buttons and a virtual keyboard, which can be used as an input/output device by the user.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 11110.

In some implementations, the architecture 1100 can present recorded audio and/or video files, such as MP3, AAC, and MPEG video files. In some implementations, the architecture 1100 can include the functionality of an MP3 player and may include a pin connector for tethering to other devices. Other input/output and control devices may be used.

A memory interface 1102 can be coupled to a memory 1150. The memory 1150 can include high-speed random access memory or non-volatile memory, such as one or more magnetic disk storage devices, one or more optical storage devices, or flash memory (e.g., NAND, NOR). The memory 1150 can store an operating system 1152, such as Darwin, RTXC, LINUX, UNIX, OS X, WINDOWS, or an embedded operating system such as VxWorks. The operating system 1152 can include instructions for handling basic system services and for performing hardware dependent tasks. In some implementations, the operating system 1152 can include a kernel (e.g., UNIX kernel).

The memory 1150 can also store communication instructions 1154 to facilitate communicating with one or more additional devices, one or more computers or servers, including peer-to-peer communications. The communication instructions 1154 can also be used to select an operational mode or communication medium for use by the device, based on a geographic location (obtained by the GPS/Navigation instructions 1168) of the device. The memory 1150 can include graphical user interface instructions 1156 to facilitate graphic user interface processing, including a touch model for interpreting touch inputs and gestures; sensor processing instructions 1158 to facilitate sensor-related processing and functions; phone instructions 1160 to facilitate phone-related processes and functions;

electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1169 to facilitate GPS and navigation-related processes; camera instructions 1170 to facilitate camera-related processes and functions; and other instructions 1172 for performing some or all of the processes described herein.

Each of the above identified instructions and applications can correspond to a set of instructions for performing one or more functions described herein. These instructions need not be implemented as separate software programs, procedures, or modules. The memory 1150 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to “opt in” or “opt out” of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other implementations are within the scope of the following claims.

What is claimed is:

1. A method comprising:

obtaining, by one or more processors, a plurality of sets of rules, wherein each of the sets of rules is specific to a different respective type of activity;

receiving, by the one or more processors, sensor data obtained by one or more sensors worn by a user;

determining, by the one or more processors, that the user is performing a first type of activity;

selecting, by the one or more processors, a first set of rules from among the plurality of sets of rules for processing the sensor data, wherein the first set of rules is specific to the first type of activity;

determining, by the one or more processors, at least one of a likelihood that the user has fallen or a likelihood that the user requires assistance based on the sensor data and the first set of rules; and generating, by the one or more processors, one or more notifications based on at least one of the likelihood that the user has fallen or the likelihood that the user requires assistance.

2. The method of claim 1, wherein the sensor data comprises location data obtained by one or more location sensors worn by the user.

3. The method of claim 1, wherein the sensor data comprises acceleration data obtained by one or more acceleration sensors worn by the user.

4. The method of claim 1, wherein the sensor data comprises orientation data obtained by one or more orientation sensors worn by the user.

5. The method of claim 1, wherein the first activity comprises playing a sport.

6. The method of claim 1, wherein the first activity comprises at least one of walking, running, or jogging.

7. The method of claim 1, wherein the first activity comprises cycling.

8. The method of claim 7, wherein determining the likelihood that the user has fallen and/or the likelihood that the user requires assistance comprises:

determining, based on the sensor data, that a distance traveled by the user over a period of time, determining, based on the sensor data, a variation in a direction of impacts experienced by the user over the period of time, determining, based on the sensor data, a rotation of the user’s wrist over the period of time, and determining that the user has fallen and/or requires assistance based on the distance traveled by the user over the period of time, the variation in the direction of impacts experienced by the user over the period of time, and the rotation of the user’s wrist over the period of time.

9. The method of claim 7, wherein determining the likelihood that the user has fallen and/or the likelihood that the user requires assistance comprises:

determining, based on the sensor data, a magnitude of an impact experienced by the user in a first direction, and determining that the user has fallen and/or requires assistance based on the magnitude of the impact experienced by the user in the first direction.

10. The method of claim 9, wherein the first direction is parallel to a handlebar of a bicycle ridden by the user.

11. The method of claim 7, wherein determining the likelihood that the user has fallen and/or the likelihood that the user requires assistance comprises:

determining, based on the sensor data, a change in an orientation of the user’s hand over a period of time, determining, based on the sensor data, a magnitude of an impact experienced by the user over the period of time in a first direction, determining, based on the sensor data, a magnitude of an impact experienced by the user over the period of time in a second direction, wherein the first direction is orthogonal to the second direction, and determining that the user has fallen and/or requires assistance based on the change in the orientation of the user’s hand over the period of time, the magnitude of the impact experienced by the user over the period of time in the first direction, and the magnitude of the impact experienced by the user over the period of time in the second direction.

12. The method of claim 1, further comprising:

determining that the user is performing a second type of activity;

selecting a second set of rules from among the plurality of sets of rules for processing the sensor data, wherein the second set of rules is specific to the second type of activity;

determining at least one of the likelihood that the user has fallen or the likelihood that the user requires assistance based on the sensor data and the second set of rules; and generating, by the one or more processors, one or more second notifications based on at least one of the likelihood that the user has fallen or the likelihood that the user requires assistance.

13. The method of claim 1, wherein generating the one or more notifications comprises:

transmitting a first notification to a communications device remote from the user, the first notification comprising an indication that the user has fallen.

14. The method of claim 13, wherein the communications device is an emergency response system.

15. The method of claim 1, wherein at least some of the one or more processors and the one or more sensors are provided on a mobile device configured to be worn by the user.

16. The method of claim 15, wherein the mobile device comprises a watch.

17. The method of claim 16, wherein the mobile device comprises at least one of a smart phone or a tablet computer.

18. The method of claim 1, where at least some of the one or more sensors are worn on a wrist of the user.

19. A system comprising:

one or more sensors configured to be worn by a user;

one or more processors; and one or more non-transitory computer readable media storing instructions that, when executed by the one or more processors, cause the one or more processors to perform operations comprising:

obtaining a plurality of sets of rules, wherein each of the sets of rules is specific to a different respective type of activity;

receiving sensor data obtained by the one or more sensors;

determining that the user is performing a first type of activity;

selecting a first set of rules from among the plurality of sets of rules for processing the sensor data, wherein the first set of rules is specific to the first type of activity;

determining at least one of a likelihood that the user has fallen or a likelihood that the user requires assistance based on the sensor data and the first set of rules; and generating one or more notifications based on at least one of the likelihood that the user has fallen or the likelihood that the user requires assistance.

20. One or more non-transitory computer readable media storing instructions that, when executed by one or more processors, cause the one or more processors to perform operations comprising:

obtaining a plurality of sets of rules, wherein each of the sets of rules is specific to a different respective type of activity;

receiving sensor data obtained by one or more sensors worn by a user;

determining that the user is performing a first type of activity;

selecting a first set of rules from among the plurality of sets of rules for processing the sensor data, wherein the first set of rules is specific to the first type of activity;

determining at least one of a likelihood that the user has fallen or a likelihood that the user requires assistance based on the sensor data and the first set of rules; and generating one or more notifications based on at least one of the likelihood that the user has fallen or the likelihood that the user requires assistance.

* * * * *